United States Patent [19]

Weaver

[11] 4,025,490

[45] May 24, 1977

[54] METHOD OF PRODUCING METAL MODIFIED PHENOL-ALDEHYDE NOVOLAK RESINS

[75] Inventor: Frederick D. Weaver, Chillicothe, Ohio

[73] Assignee: The Mead Corporation, Dayton, Ohio

[22] Filed: Nov. 10, 1975

[21] Appl. No.: 630,689

Related U.S. Application Data

[63] Continuation-in-part of Ser. No. 528,039, Nov. 11, 1974, abandoned.

[52] U.S. Cl. .............................. 260/53 R; 260/14; 260/29.3; 260/33.6 R; 260/51 R; 260/59 R; 427/145; 427/148; 427/151; 427/261; 428/326; 428/535; 428/913; 428/914

[51] Int. Cl.² .................... C08G 8/12; C08G 8/28; C08G 8/32

[58] Field of Search ............. 260/51 R, 53 R, 59 R

[56] References Cited

UNITED STATES PATENTS

| | | | |
|---|---|---|---|
| 3,014,868 | 12/1961 | Munns et al. | 260/53 X |
| 3,418,273 | 12/1968 | Economy et al. | 260/59 X |
| 3,516,845 | 6/1970 | Brockett | 428/452 X |
| 3,723,156 | 3/1973 | Brockett et al. | 428/307 X |
| 3,732,120 | 5/1973 | Brockett et al. | 260/59 X |
| 3,737,410 | 6/1973 | Mueller | 260/59 |
| 3,817,922 | 6/1974 | Barth | 260/53 R |

*Primary Examiner* — Howard E. Schain
*Attorney, Agent, or Firm* — Earl B. Brookbank, Jr.; Stephen H. Cagle; Wilson G. Palmer

[57] ABSTRACT

Metal-modified para-substituted phenol-aldehyde novolak resins suitable for use in pressure sensitive manifolding systems are produced by melting and mixing together a para-substituted phenol-aldehyde resin and a metal alkanoate salt in the presence of an ammonium compound.

11 Claims, No Drawings

METHOD OF PRODUCING METAL MODIFIED PHENOL-ALDEHYDE NOVOLAK RESINS

This application is a continuation-in-part of co-pending application Ser. No. 528,039, filed Nov. 11, 1974, now abandoned.

BACKGROUND OF THE INVENTION

This invention relates to metal-modified phenol-aldehyde novolak resins, and more particularly to an improved method for producing them. Such metal-modified novolaks are useful as developing agents for colorless chromogenic dye precursors such as Crystal Violet lactone. Color producing systems of this type are useful in manifolding systems wherein a color-developer, a color precursor and a common solvent for each are maintained in isolation on a surface of a carrier such as paper, or in isolation on separate surfaces of a carrier. Conveniently, the color precursor and the solvent may be encapsulated in microcapsules of the type described in U.S. Pat. No. 2,800,457, and said microcapsules together with an adhesive applied as a coating to a web of paper. The color developer may be applied as a coating to a second web of paper, either alone or admixed with mineral particles. When the two webs of paper are superimposed with their respective coatings in contact and subjected to localized pressure as by a typewriter key, the walls of the microcapsules in the area subjected to pressure are ruptured, and the solution of color precursor and solvent originally contained in the ruptured capsules is transferred in a marking pattern to the paper surface carrying the color developer. Almost instantaneously a colored mark is formed on the surface carrying the color developer. Alternately, the microcapsules and color developer may be intermixed on the same surface of a paper web. If desired, the microcapsules may contain a solvent solution of the color developer, in which event the color precursor is applied as a coating to the second web of paper, or is intermixed with the microcapsules on the same paper surface.

The use of metal compounds as a means of improving color-forming reactions of phenol-aldehyde novolak resins with basic colorless chromogenic dye precursors is known. Acidic water soluble metal salts incorporated in aqueous coatings of ground novolak resins are taught in U.S. Pat. No. 3,516,845, while U.S. Pat. No. 3,723,156 teaches a further improvement through similar use of oil-soluble metal salts. U.S. Pat. No. 3,732,120 and 3,737,410 discloses the interaction of a metal compound such as zinc hydroxy benzoate, zinc acetylacetonate and zinc dibenzoate, with a para-substituted phenol-aldehyde novolak resin by melting the resin and the metal compound together. The melt is ground after cooling and then applied to a paper surface. It is stated that the metal-resin product gives increased color intensity and resistance to fading as compared to the novolak resin alone when used in color forming reaction with basic colorless chromogenic dye precursors such as Crystal Violet Lactone.

SUMMARY OF THE INVENTION

The process of the present invention involves formation of a metal-novolak resin product by melting together a phenol-aldehyde novolak resin and a metal salt of an alkanoic acid in the presence of a weak ammonium compound or ammonia gas.

The resin product of this invention results in significant improvements, when used in a manifolding system, in rate of color image development, stability of the image on ageing, (fade resistance) and storage stability of the manifolding system prior to imaging (decline).

Typical phenol-aldehyde novolaks suitable for the practice of this invention are para-phenylphenol-formaldehyde, para-butylphenol-formaldehyde, para-octylphenol-formaldehyde, para-nonylphenol-formaldehyde and para-chlorophenol-formaldehyde. The preferred novolak resin is para-octylphenol-formaldehyde characterized by a number average molecular weight of approximately 500, a ball and ring melting point of 100° C. and a polymeric distribution predominating in monomeric and dimeric, with lesser amounts of trimeric, tetrameric and higher oligamers.

Suitable metals are copper, zinc, cadmium, aluminum, indium, tin, chromium, cobalt and nickel. Zinc alkanoates are especially useful, and are readily available in commercial quantities.

The anion of the metal salt is selected from alkanoic acids having from one to three carbon atoms such as formic, acetic and propionic. Of these propionic is preferred, and zinc diproprionate gives exceptional results. The metal content of the metal-modified novolak resin should be more than 0.5% by weight and may range up to 15% by weight. Usually a range of 1.5 to 5% by weight is employed.

The inclusion of a weak ammonium compound or ammonia gas is very beneficial in the process of this invention. While the manner in which it functions is not completely understood, it supresses the formation of metal oxide during the melting process. Any metal oxide formed in effect prevents that portion of the metal from entering into modification of the novolak resin and is wasted. Ammonium compounds useful in the process of the invention are weak ammonium salts, such as ammonium carbonate, ammonium acetate and ammonium bicarbonate. Ammonium hydroxide may be used, and satisfactory results have been obtained by blanketing the mixture of novolak resin and metal alkanoate with ammonia gas during the heating and mixing thereof in the reaction kettle. Ammonium carbonate is preferred. The process incorporates 0.4 to 5.6 equivalents of ammonium, with 0.65 being equivalents being preferred.

In carrying out the process of this invention, it is desirable to protect the surface of the novolak resin and the metal alkanoate during the melting and mixing operation, from contact with the oxygen present in the ambient air as otherwise, dicoloration of the resin results. This may be accomplished by passing a stream of inert or unreactive gas over the surface of the mixture in the reaction kettle. Suitable gasses are helium or nitrogen, and as mentioned supra, ammonia gas may be used.

Table 1 (below) lists the ingredients used in preparing examples of five zinc-modified novolak resins. In the table, identification of the novolak resin is given as a group para to the phenolic hydroxy group. The resins are para-substituted phenol-formaldehyde novolaks as described supra. The same procedure was followed in preparing each of the examples.

Table 1.

| Example | 1 | 2 | 3 | 4 | 5 |
| --- | --- | --- | --- | --- | --- |
| Novolak resin | p-octyl | p-phenyl | p-octyl | p-octyl | p-octyl |
| Ammonium | Carbon- | Carbon- | Carbon- | Carbon- | Acet- |

Table 1.-continued

| Example | 1 | 2 | 3 | 4 | 5 |
|---|---|---|---|---|---|
| salt | ate | ate | ate | ate | ate |
| Zinc salt | dipropionate | dipropionate | diacetate | diformate | dipropionate |

Into a heated resin reaction kettle were placed, as dry powders, 1000 parts by weight of the para-substituted phenol-formaldehyde resin, 0.75 moles of anhydrous zinc dialkanoate salt, and 1.0 moles of freshly powdered ammonium-salt. The powders were mixed and heated to a temperature of 160°–170° C for a period of 1 hour. A constant flow of helium was maintained over the mixture during this time. Thereafter, the melt was discharged into an aluminum tray and allowed to cool to room temperature.

The zinc-modified novolak resins of Examples 1 through 5 were then evaluated in carbonless copy paper systems in two ways. In the first evaluation, the zinc-modified resin was dissolved in toluene to provide a solution containing 10 to 35% resin solids. This solution was applied to one surface of a bond paper by gravure coating to give a weight of dried resin of about 0.2 lb./25×35–500 ream.

The second evaluation was conducted by grinding the zinc-modified resin to a particle size of less than 2 microns. This was done in an attritor using 50 parts of water, 50 parts of the resin, 3.5 parts of kaolin and a small amount of dispersing agent. This resin dispersion was then incorporated into a coating slurry using:

64 parts kaolin clay,
3 parts calcium carbonate,
5.4 parts colloidal silica,
3 parts hydroxyethyl starch,
12 parts styrene-butadiene latex,
12 parts resin dispersion, and yield sufficient water to yield a solids content of about 30%. This coating slurry was applied to one surface of a paper base by air-knife coating to give a coating weight of 0.5 to 0.3 lb/25 × 35–500 ream of zinc-modified resin (corresponding to a total coat-weight of 4.2 to 2.5 lb/25 × 35–500 ream). All parts are by weight on a dry basis.

The solvent coated and the dispersion coated papers were tested as receiving sheets by placing the coated surfaces thereof in contact with the coated side of a paper coated with microcapsules containing a oil solution of Crystal Violet Lactone. These sheet couples were imaged with an electric typewriter using the character $m$ in a repeating block pattern, and the intensity of the images was measured as the ratio of the reflectance of the imaged area to the reflectance of the unimaged background, after an elapsed time of twenty minutes. Thus, the more intense or darker images shown as lower values, and higher values indicate weak or faint images. This test is called Typewriter Intensity and may be expressed mathematically as $$T.I. = (100)(R_i/R_o)$$

where $R_i$ is reflectance of the imaged area and $R_o$ is reflectance of the background (unimaged) area as measured with a Bausch and Lomb Opacimeter. Two values are reported for typewriter intensity, one based on a 2-part assembly and one on a 4-part assembly. The values are reported as Initial T.I. in Tables 2 and 3.

Print speed was measured by imaging by one pass through a pair of calendar rolls, with image intensity measured after 30 seconds development time. The lower the value reported, the faster the print speed.

Storage stability or decline of the coated papers was determined by a three-hour exposure of the coated side of the paper to ultra-violet light in a Fadeometer followed by imaging and determination of typewriter intensity.

Fade resistance was measured by loss of image intensity upon 3 hours exposure of an imaged area to ultra violet light, again using a Fadeometer.

In the tests, 2 controls were used wherein the novolak resin was not modified with a zinc dialkanolate. Control A was a para-phenylphenolformaldehyde novolak, while Control B was a para-octylphenol-formaldehyde novolak.

Table 2

Tests of Dispersion Coated Papers

| Example No. | Initial T.I. 2 part | Initial T.I. 4 part | Print Speed | Fade (2 part form) | Decline (2 part form) |
|---|---|---|---|---|---|
| Control A | 67 | 57 | 56 | 83 | 72 |
| Control B | 78 | 69 | 68 | 87 | 80 |
| 1 | 52 | 43 | 45 | 60 | 50 |
| 2 | 65 | 52 | 52 | 73 | 69 |
| 3 | 54 | 44 | 42 | 63 | 54 |
| 4 | 58 | 44 | 42 | 67 | 71 |
| 5 | 61 | 49 | 50 | 74 | 64 |

Table 3

Tests of Solvent Coated Papers

| Example No. | Initial T.I. 2 part | Initial T.I. 4 part | Print Speed | Fade | Decline |
|---|---|---|---|---|---|
| Control A | 62 | 57 | 91 | 80 | 70 |
| Control B | 88 | 82 | 89 | 88 | 86 |
| 1 | 60 | 53 | 72 | 71 | 67 |
| 2 | 54 | 42 | 76 | 71 | 71 |
| 3 | 61 | 55 | 71 | 67 | 71 |
| 4 | 62 | 55 | 70 | 74 | 68 |
| 5 | 68 | 60 | 71 | 76 | 72 |

In Tables 2 and 3, Control A should be compared with Example 2 (both involving p-phenylphenol-formaldehyde novolak resins), and Control B should be compared to the remaining examples (involving p-octylphenolformaldehyde novolak resin). An examination of the data shows that novolak resins modified by zinc alkanoates using the process of this invention yield significant improvements in Initial T.I., Print Speed, Fade and Decline.

I claim:

1. A method for producing a metal-modified phenol-aldehyde novolak resin comprising the steps of melting together with mixing, a composition consisting essentially of a one to three carbon atom alkanoic salt of a metal selected from copper, zinc, cadmium, aluminum, indium, tin, chromium, cobalt and nickel, an ammonium compound or ammonia and a phenol-aldehyde novolak resin material.

2. The method of claim 1 wherein the composition is protected, during melting, from contact with air.

3. The method of claim 1 wherein the composition is protected, during melting by a flow of helium gas over the surface thereof.

4. The method of claim 1 wherein the alkanoic salt is a salt of propionic acid.

5. The method of claim 1 wherein the alkanoic salt is a zinc salt.

6. The method of claim 1 wherein the alkanoic salt is zinc dipropionate.

7. The method of claim 1 wherein the novolak resin is a para octylphenolformaldehyde resin.

8. The method of claim 1 wherein the novolak resin is a paraphenylformaldehyde resin.

9. The method of claim 1 wherein the ammonium compound is selected from ammonium acetate, ammonium carbonate, and ammonium hydroxide.

10. The method of claim 1 wherein the alkanoic salt is zinc dipropionate, the ammonium compound is ammonium carbonate, and the novolak resin is a para-octylphenol formaldehyde resin.

11. A method for producing a zinc-modified paraoctylphenol-formaldehyde novolak resin by the steps of mixing and melting together 1000 parts by weight of paraoctylphenol-formaldehyde novolak resin, 0.75 moles of zinc dipropionate and 1.9 moles of ammonium carbonate, heating to a temperature of 160° to 170° C. for one hour, and maintaining a flow of helium over the surface during the heating period, to produce a product containing 4.9% by weight of zinc based on said resin.

* * * * *